(12) United States Patent
Winzer et al.

(10) Patent No.: US 11,362,755 B2
(45) Date of Patent: Jun. 14, 2022

(54) ADAPTIVE CAPACITY OPTIMIZATION IN OPTICAL TRANSMISSION SYSTEMS

(71) Applicant: Nokia Solutions and Networks Oy, Espoo (FI)

(72) Inventors: Peter Winzer, Holmdel, NJ (US); Junho Cho, Holmdel, NJ (US); Andrew Chraplyvy, Holmdel, NJ (US)

(73) Assignee: Nokia Solutions and Networks Oy, Espoo (FI)

(*) Notice: Subject to any disclaimer, the term of this patent is extended or adjusted under 35 U.S.C. 154(b) by 472 days.

(21) Appl. No.: 16/118,882

(22) Filed: Aug. 31, 2018

(65) Prior Publication Data
US 2020/0076526 A1 Mar. 5, 2020

(51) Int. Cl.
*H04B 10/08* (2006.01)
*H04J 14/02* (2006.01)
(Continued)

(52) U.S. Cl.
CPC ........... *H04J 14/0221* (2013.01); *G02B 5/20* (2013.01); *H04B 10/564* (2013.01); *H04B 10/697* (2013.01); *H04J 14/0213* (2013.01)

(58) Field of Classification Search
CPC ............... H04B 10/564; H04B 10/697; H04B 10/07955; H04B 10/077; H04B 10/07953;
(Continued)

(56) References Cited

U.S. PATENT DOCUMENTS

| 6,008,935 A * | 12/1999 | Fujita | H01S 5/06832 |
| | | | 359/337.12 |
| 6,580,531 B1 * | 6/2003 | Swanson | H04B 10/504 |
| | | | 398/158 |

(Continued)

FOREIGN PATENT DOCUMENTS

EP 2645599 A1 10/2013

OTHER PUBLICATIONS

Giacoumidis, et al.; "Exceeding the Nonlinear Shannon-Limit in Coherent Optical Communications using 3D Adaptive Machine Learning"; https://arxiv.org/ftp/arxiv/papers/1802/1802.09120.pdf; Dublin City University; Undated; pp. 1-18.

(Continued)

*Primary Examiner* — Hibret A Woldekidan

(57) ABSTRACT

A system comprising an optical receiver for multi-wavelength-channel optical communication, an optical source of spontaneous emission light and a tunable optical filter connected to receive the light at an input. The tunable optical filter can have a filter spectrum with spectral passbands separated by spectral notches. The system also includes an optical fiber link connecting an output of the optical filter to the optical receiver for multi-wavelength-channel optical communication. The receiver can be configured to make a measurement indicative of an optical power level in at least one of the notches or to make measurements of optical power levels and at least one of the passbands and at least one of the notches in response to the optical source transmitting the filtered light to the optical fiber link. Another (Continued)

embodiment includes an apparatus comprising an optical test module including a source of spontaneous emission light and an optical filter connected to receive the spontaneous emission light from the source.

17 Claims, 7 Drawing Sheets

(51) Int. Cl.
*H04B 10/564* (2013.01)
*H04B 10/69* (2013.01)
*G02B 5/20* (2006.01)

(58) Field of Classification Search
CPC ........ H04B 10/07957; H04B 10/25073; H04B 10/504; H04B 10/572; H04B 10/0775; H04J 14/0213; H04J 14/0221; G02B 5/20
USPC .................................. 398/25, 26, 27, 38, 69
See application file for complete search history.

(56) References Cited

U.S. PATENT DOCUMENTS

| | | | | |
|---|---|---|---|---|
| 6,873,795 | B1* | 3/2005 | Sugaya | H04B 10/077 398/34 |
| 7,385,754 | B2* | 6/2008 | Ghera | H04J 14/02 359/337.1 |
| 7,526,201 | B2 | 4/2009 | Mohs et al. | |
| 2003/0090755 | A1* | 5/2003 | Chung | H04B 10/07953 398/26 |
| 2013/0094851 | A1* | 4/2013 | Xu | H04B 10/07957 398/25 |
| 2014/0270756 | A1* | 9/2014 | Oda | H04B 10/0791 398/26 |
| 2015/0333824 | A1 | 11/2015 | Swinkels et al. | |
| 2016/0094304 | A1 | 3/2016 | Butler | |
| 2016/0261343 | A1* | 9/2016 | Akasaka | H04B 10/25073 |
| 2017/0005747 | A1* | 1/2017 | Kim | H04J 14/0221 |

OTHER PUBLICATIONS

Durand, et al.; "Estimation Uncertainties in the Optical Signal-to-Noise Ratio Network Optimization"; Journal of Microwaves, Optoelectronics and Electromagnets Applications, vol. 15, No. 1; Mar. 2016; pp. 1-18.

Le, et al.; "Demonstration of Phase-Conjugated Subcarrier Coding for Fiber Nonlinearity Compensation in CO-OFDM Transmission"; Journal of Lightwave Technology, vol. 33, No. 11; Jun. 1, 2015; pp. 2206-2212.

Gebrewold, et al.; "Bit- and Power-Loading—A Comparative Study on Maximizing the Capacity of RSOA Based Colorless DMT Transmitters"; applied sciences; MDPI; Aug. 6, 2017; 17 pgs.

Bastos-Filho, et al.; "Comparing OSNR based policies for an adaptive-alternative IA-RWA algorithm applied to all-optical networks"; Journal of Microwaves, Optoelectronics and Electromagnetic Applications; vol. 12, No. 2; Dec. 2013; pp. 1-9.

Elson, et al.; "Investigation of bandwidth loading in optical fibre transmission using amplified spontaneous emission noise"; Optics Express, vol. 25, No. 16; Aug. 7, 2017; 9 pgs.

Chen, et al.; "Broadband Source Sliced by Cascaded Interleavers"; 14th OptoElectronics and Communications Conference, Vienna, Austria; 10.1109/OECC.2009.5218310; Jul. 2009; 2 pgs.

* cited by examiner

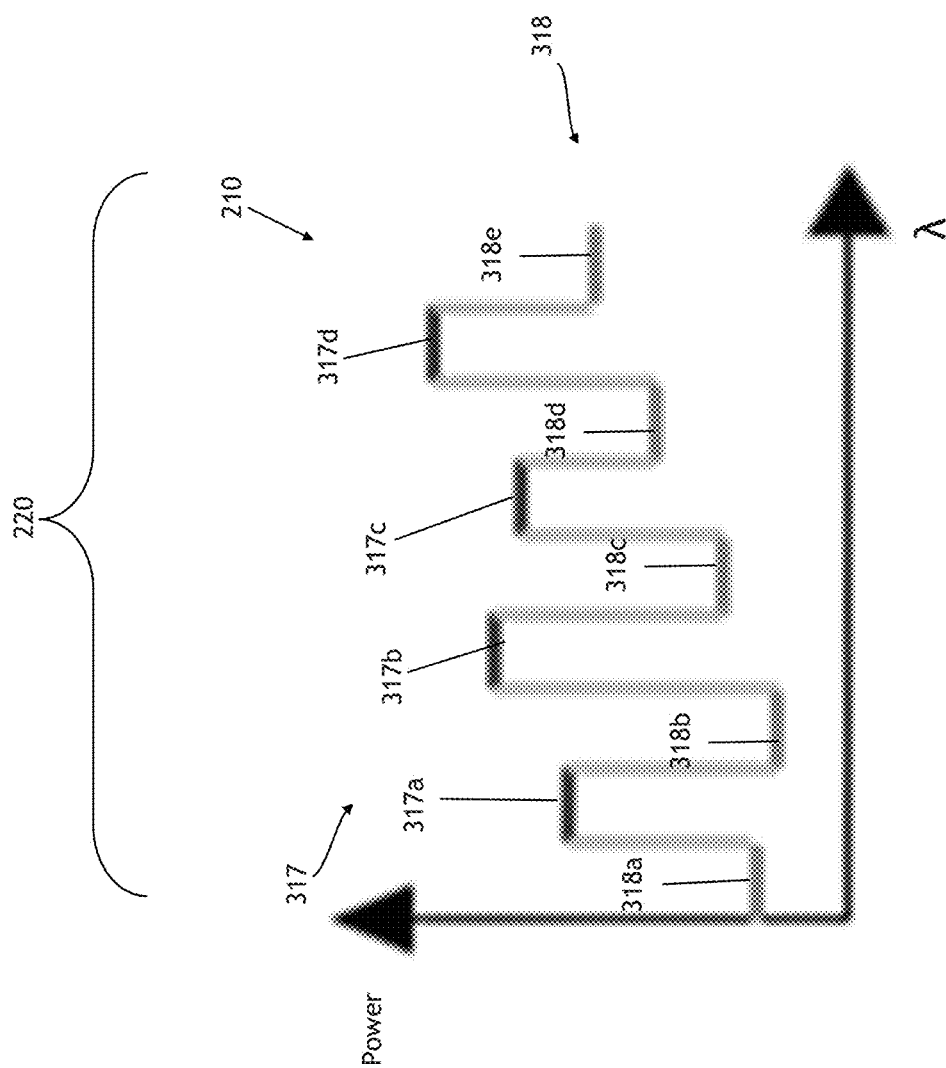

ADAPTIVE CAPACITY OPTIMIZATION IN OPTICAL TRANSMISSION SYSTEMS

TECHNICAL FIELD

The invention relates, in general, to optical systems for multi-wavelength-channel optical communication and an optical apparatus having an optical test module for transmitting filtered spontaneous emission light to a multi-wavelength-channel optical receiver.

BACKGROUND

This section introduces aspects that may help facilitate a better understanding of the inventions. Accordingly, the statements of this section are to be read in this light and are not to be understood as admissions about what is prior art or what is not prior art.

Various optical transmission systems provide for flexible modulation formats, e.g., flexible optical wavelength channel parameters.

Various types of test and monitoring equipment are available for measuring properties of wavelength-division multiplexing (WDM) optical communication links.

SUMMARY

One embodiment is a system comprising an optical receiver for multi-wavelength-channel optical communication, an optical source of spontaneous emission light and a tunable optical filter connected to receive the light at an input. The tunable optical filter can have a filter spectrum with spectral passbands separated by spectral notches. The system also includes an optical fiber link connecting an output of the optical filter to the optical receiver for multi-wavelength-channel optical communication. The receiver can be configured to make a measurement indicative of an optical power level in at least one of the notches or to make measurements of optical power levels and at least one of the passbands and at least one of the notches in response to the optical source transmitting the filtered light to the optical fiber link.

Some embodiments of the system further include an optical transmitter configured to set one or more modulation parameters and/or an optical signal power of at least one signal-bearing optical wavelength channel based on the made measurement or made measurements. In some such embodiments, the optical transmitter can be configured to set a symbol rate of at least one signal-bearing optical wavelength channel based on the measurement or measurements. In some such embodiments, the optical transmitter can be capable of setting one or more power shaping parameters and/or symbol rate of at least one signal-bearing optical wavelength channel such that different signal-bearing optical wavelength channels have substantially different signal to noise ratios than each other as measured at the optical receiver. In some such embodiments, the optical transmitter can be configured to perform the setting such that the signal to noise ratios of the signal-bearing optical wavelength channels vary by more than about 1 dB over the channels.

In some embodiments of the system, the tunable optical filter can be configured to adapt the filtering of the filtered light based on the made measurement or made measurements. In some embodiments, the system is part of a terrestrial or a submarine optical point-to-point or mesh network system.

Another embodiment is an optical apparatus comprising an optical test module including a source of spontaneous emission light and an optical filter connected to receive the spontaneous emission light from the source, the module capable of transmitting filtered spontaneous emission light from the optical filter to a first end of an optical fiber link. The spectrum the filter can have a filtering spectrum with optical passbands separated by optical notches. The optical test module can be configured to determine an optical transmission characteristic to the optical fiber link based on a measurement, at a second end of the optical fiber link, indicative of an optical power received in one or more of the notches or indicative of an optical power received in one or more of the passbands over an optical power received in one or more of the notches received at the second end of the optical fiber link.

In some embodiments of the apparatus, the optical test module can be capable of determining modulation parameters and/or an optical signal power of the optical transmitter such that the transmitter transmits different signal-bearing optical wavelength channels to the second end of the optical fiber link with substantially different signal to noise ratios thereat. In some such embodiments, the signal to noise ratios of the signal-bearing optical wavelength channels can vary by more than 1 dB over the channel.

In some embodiments of the apparatus, the optical test module includes an optical interleaver or a cascade of optical interleavers configured to receive the spontaneous emission light and provide a pattern of wavelength bands to the filter. In some such embodiments, the pattern of the wavelength bands includes an approximately periodic series of bands of about 50 percent spectral-duty cycle or less. In some such embodiments, the optical test module includes an optical spectrum analyzer configured to measure the filtered spontaneous emission light transmitted to the optical fiber link.

Some embodiments of the apparatus further include a control module having an electronic digital processing unit configured to read and execute instructions stored in non-transient computer readable memory of the module, the instructions for performing steps of a method to cause the optical test module to generate control signals to change the optical output from one or more of an optical transmitter, the optical source or the tunable optical filter or an adjustable gain equalization filter in the optical fiber link. In some such embodiments, the control module can be configured to receive signals indicative of the made measurement or measurements, and based the made measurement, cause the unit to change one or more of the control signals to alter the optical output from one or more of the optical transmitter, the optical source, the tunable optical filter or the adjustable gain equalization filter. In some such embodiments, the change in optical output caused by the control signals includes changing at least one of an optical modulation parameter, an optical transmission power, and a filtering characteristic of at least one data-bearing optical wavelength channel.

Another embodiment is a system comprising a multi-wavelength-channel optical transmitter, an optical receiver for multi-wavelength-channel optical communication, and an optical fiber link connecting the optical transmitter and the optical receiver for multi-wavelength-channel optical communication. The system also comprises an optical source of spontaneous emission light and a tunable optical filter connected to filter the light and deliver filtered light to the optical fiber link. The filter can have a filtering spectrum with dummy optical wavelength channels separated by notches in a wavelength band of the optical transmitter. The receiver is configured to make a measurement indicative of an optical noise level in at least one of the notches or an optical signal to noise ratio of one or more of the dummy optical wavelength channels relative to the optical noise level in the notches frequency-adjacent to the dummy optical wavelength channels in response to the optical source transmitting the filtered light to the optical fiber link.

Another embodiment is an apparatus for transmitting filtered spontaneous emission light to a multi-wavelength-channel optical receiver via a line-loading optical fiber link. The filtered spontaneous emission light can have a filtering spectrum with dummy optical wavelength channels separated by notches in an optical wavelength band for communications via the optical transmitter. The optical test module is configured to set a transmission power parameter and/or spectral width of one or more of the dummy optical wavelength channels based on a measurement indicative of an optical noise level in at least one of the notches or an optical signal to noise ratio of one or more of the dummy optical wavelength channels relative to the optical noise level in the notches frequency-adjacent to the one or more dummy optical wavelength channels at the optical receiver due to the transmitting.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which:

FIG. 3A schematically illustrates an example spectral distribution of optical power received from an optical fiber link of the system at a receiver-side optical spectrum analyzer ($OSA_2$) of the system, the optical power including a received portion of the transmitted filtered spontaneous emission light on one or more optical wavelength channels (e.g., the signal power corresponding to the received dummy optical wavelength channels of the spontaneous emission light);

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

As optical amplifier/transponders are becoming more flexible, e.g., through probabilistically shaped modulation formats, the ability to quickly determine the optimum modulation format for each wavelength-division multiplexed (WDM) channel is a missing ingredient to take full advantage of amplifier flexibility.

Some embodiments of the invention benefit from adaptively changing the power loading of channels, together with modulation formats and data transmission rates, to maximize transmission capacity. Unlike conventional optical communication systems having a constant signal to noise ratio, SNR, across a wavelength band, the disclosed system is not restricted to having same SNR thereby facilitating having an increased aggregate data transmission capacity across all channels (in information theoretic terminology, the system is maximizing the sum-rate, while conventional optical transmission systems are either equalizing or maximizing per-wavelength bit rates).

Figure 1:
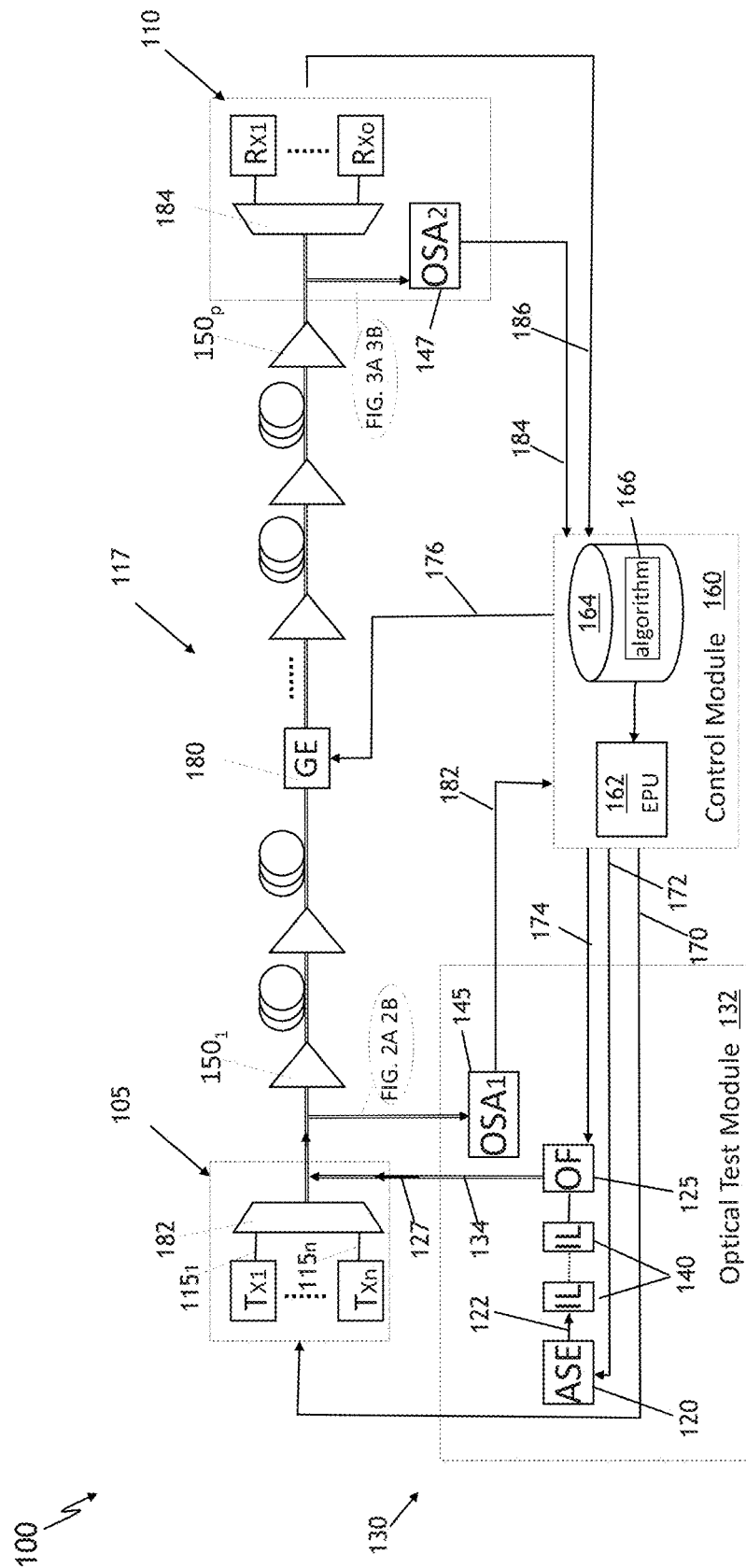
FIG. 1 presents a block diagram of example embodiments of the system and apparatus of the disclosure.

Some embodiments use a modulated (e.g., via filtering) spontaneous emission (SE) light source (e.g., amplified spontaneous emission (ASE) light source) to measure optical noise or SNR across a wavelength band of interest, and such measures can be combined with other information such as non-linear transmission performance information as further disclosed herein, to allow some such embodiments to calculate an appropriate power loading, e.g., to thereby obtain a higher total information capacity across a multiplex of signal-bearing wavelength channels. As further explained below, increasing the aggregate information capacity can be facilitated by adjusting the properties of individual signal-bearing wavelength channels, e.g., modulation properties such as the form of the optical signal constellation, probabilistic power shaping, optical symbol rate, pulse shaping, FEC coding, pilot scheme, and/or optical channel power. Additionally, increasing the aggregate information capacity can be facilitated by modifying the optical powers and/or spectral widths of dummy wavelength channel signals generated by modulating or filtering ASE FIG. 1 is a block diagram schematically illustrating example embodiments of an optical fiber communication system 100 (e.g., a terrestrial or a submarine optical system) and FIGS. 2A-3B present example spectral distributions of optical power (e.g., signal power) at different locations in the system 100.

Some embodiments of the system 100 may be used prior to installation of the optical transmitter 105 or during operation of the link 117.

With continuing reference to FIGS. 1-3B, some embodiments of the system 100 can include a multi-wavelength-channel optical transmitter 105, an optical receiver 110 for multi-wavelength-channel optical communication and an optical fiber link 117 connecting the optical transmitter 105 and the optical receiver 110 for multi-wavelength-channel optical communication (e.g., parallel multi-wavelength-channel optical communication).

Some embodiment of the system 100 can include an optical source 120 of spontaneous emission (SE) light 122 (e.g., ASE light) and a tunable optical filter 125 optically connected to filter the SE light 122 and deliver filtered SE light 127 to the optical fiber link 117. The filter 125 can produce a spectrum 210 of the SE light 127 having pass optical wavelength bands with the SE light 217 (i.e., non-data-bearing SE light) separated by wavelength notches 218 in which the SE light is blocked (i.e., wavelength bands with substantially lower intensity SE light or with no SE light). Said set of pass and notch wavelength bands are located in one or more individual transmission wavelength channels 220 of the optical transmitter 105. The receiver 110 is configured to make one or more measurements indicative of an optical power level in at least one of the wavelength notches 318 or is configured to make one or more measurements indicative of an optical signal to noise ratio (OSNR). E.g., the notches can correspond to notches 218a-218e in the spectrum from the optical filter 125 of FIG. 1. The measurement of the OSNR may be or include measuring received optical power in one or more of the pass optical wavelength bands 317 of the optical filter 125 and measuring received optical power in one or more of the wavelength notch(es) 318 of the optical filter 125 in response to transmitting the SE light 122 filtered by the optical filter 125 to the optical fiber link 117. In particular, the receiver 110 may determine the OSNR as the ratio of the measured received optical power level in the pass wavelength band(s) over the measured received optical power level in the wavelength notch(es).

Some embodiment of the system 100 can include an optical source 120 of spontaneous emission light 122 and a tunable optical filter 125 connected to filter the light 122 and deliver filtered light 127 to the optical fiber link 117. The filter 125 can have a filtering spectrum 210 with dummy optical wavelength channels 217 (non-signal-bearing channels) separated by notches 218 in a wavelength band 220 of the optical transmitter 105. The receiver 110 can be configured to make a measurement indicative of an optical noise level in at least one of the notches 318 or an optical signal to noise ratio of one or more of the dummy optical wavelength channels 317 relative to the optical noise level in the notches 318 that are frequency-adjacent to the dummy optical wavelength channels 317 in response to the optical source transmitting the filtered light to the optical fiber link 117.

Figure 2A:
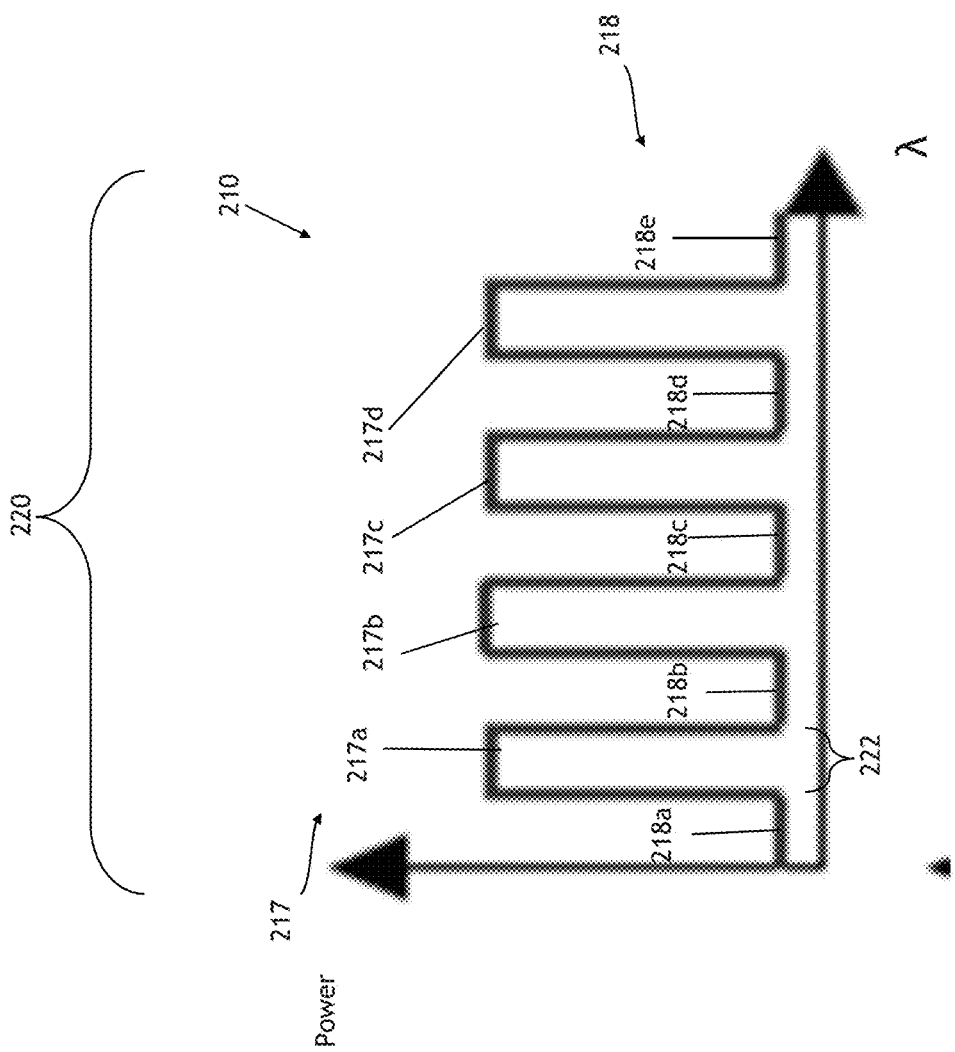
FIG. 2A schematically illustrates an example spectral distribution of optical power launched into an optical fiber link of the system, the optical power including substantially only filtered and optionally amplified spontaneous emission light on optical channel(s), i.e., dummy wavelength-channel signals.
Figure 2B:
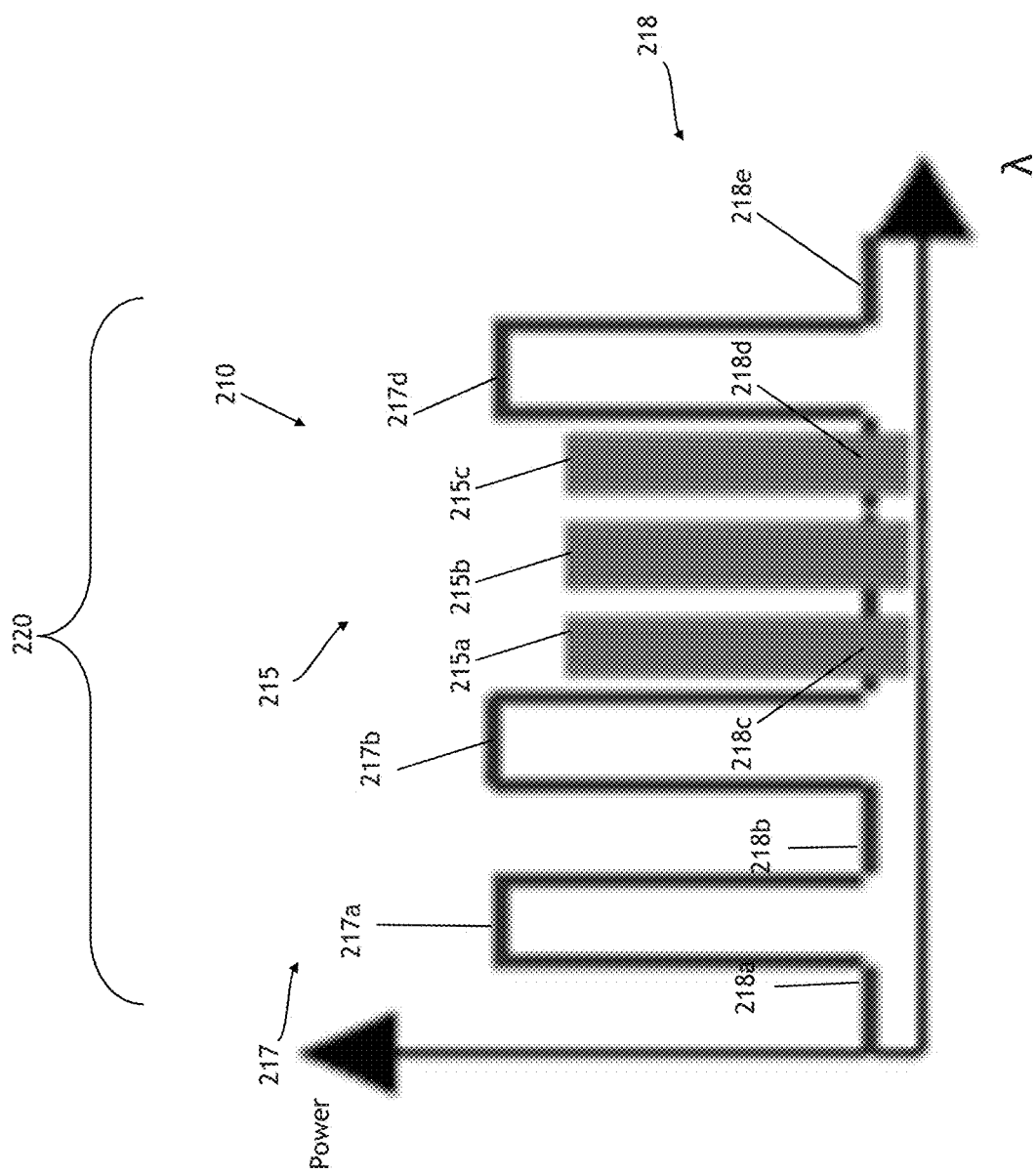
FIG. 2B schematically illustrates an example spectral distribution of optical power launched into an optical fiber link of the system, the optical power including filtered and optionally amplified spontaneous emission light on one or more optical channels and data-bearing light on one or more optical wavelength channels.

FIG. 2A schematically illustrates an example spectral distribution of optical power launched into an optical fiber link 117, the optical power includes optical pass wavelength bands 217 (e.g., 217a . . . 217d) of spontaneous emission light 122 separated by wavelength notches 218 (e.g., 218a . . . 218e) in which SE light is blocked or has a substantially lower intensity. FIG. 2B schematically illustrates another example spectral distribution of optical power launched into an optical fiber link 117, the optical power corresponding to transmitted optical wavelength bands 217 (i.e., bands 217a, 217b, and 217c) of spontaneous emission light 122 and transmitted optical wavelength channels bearing data 215 (e.g., channels 215a . . . 215c).

Figure 3B:
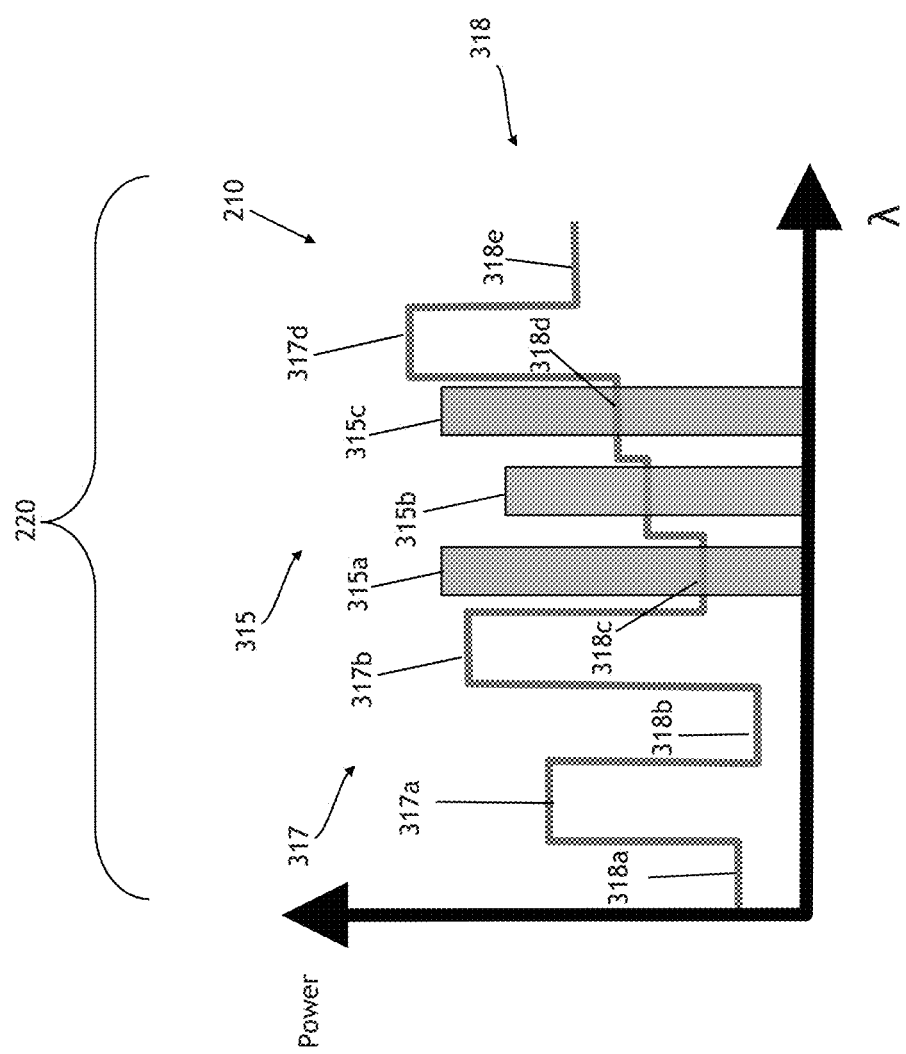
FIG. 3B schematically illustrates an example spectral distribution of optical power received from an optical fiber link of the system, the optical power including received power of the transmitted filtered spontaneous emission light on one or more optical wavelength channels of one or more dummy optical wavelength channels and one or more optical wavelength channels bearing data.

FIG. 3A presents an example spectral distribution of optical power received at the receiver 105 from the optical fiber link 117 in response to the light transmitted to the other end of the optical fiber link 117 having the spectrum of FIG. 2A. The optical power includes power for light received in the pass bands 317 of the optical filter 125. The optical power also includes power light received in the wavelength notches 318 (e.g., 318a . . . 318e) of the optical filter 125. FIG. 3B presents another example spectral distribution of optical power received at the receiver 110 from the optical fiber link 117 in response to the light transmitted to the other end of the optical fiber link 117 having the spectrum of FIG. 2B. The optical power includes power for the light received in the pass optical wavelength bands 317 of the optical filter 125 and the power received in the data-bearing optical wavelength channels 315 (e.g., 315a . . . 315c).

In some embodiments, the optical transmitter 105 can be configured to set one or more modulation parameters and/or an optical signal power of at least one data-bearing (e.g., signal-bearing) optical wavelength channel 215 based on the measurement indicative of the optical noise level or the optical signal to noise ratio at the optical receiver 110. Setting the modulation parameters can include setting different constellations (e.g., probabilistically shaped or uniformly used constrellations), different pilots, different forward error correction (FECs) schemes, symbol rate, and/or pulse shaping parameters. For instance, in some embodiments, the optical transmitter 105 can be configured to set a symbol rate of at least one data-bearing optical wavelength channel 215 based on such measurements by the optical receiver 110. Additionally or alternatively, in some embodiments, the tunable optical filter 125 can be configured to adapt the filtering of the filtered light 127 based on such measurements.

In some embodiments, the optical transmitter 105 is capable of setting one or more power shaping parameters and/or a symbol rate of at least one data-bearing optical wavelength channel 215 such that different data-bearing optical wavelength channels 315 have substantially different signal to noise ratios at the optical receiver 110.

The term substantially different signal levels as used herein refers to an at least about 25% difference (e.g., at least an about 1 dB difference) in signal strength between at least two different data-bearing optical wavelength channels 315. In some such embodiments, the optical transmitter 105 can be configured to perform the setting such that the signal to noise ratios of the signal-bearing optical wavelength channels 315 vary by more than about 1 dB (or 2 dB, 3 dB, or 4 dB in different embodiments) over the channels 315. For example, over the bandwidth range 220, the SNR of the signal-bearing optical wavelength channels 315 with the highest SNR can be at least about 25% higher than the SNR of signal-bearing optical wavelength channels 315 with the lowest SNR, and the other signal-bearing optical wavelength channels 315 can have SNRs intermediate between these two channels.

For clarity, only one optical transmission path is shown in FIG. 1. Although the system embodiment illustrated in FIG. 1 presents a point-to-point optical communication system, the system could alternately include, or be part of, a mesh optical network system. One skilled in the pertinent art would understand how the optical fiber link 117 could include multiple parallel fibers per either direction, and how each path could include a concatenation of optical amplifiers, transmission fibers as well as fixed or adjustable gain equalization filters 180 (GE).

Embodiments of the optical transmitter 105 at the terminal transmit side of the optical fiber link 117 can include optical WDM transmitter modules (e.g., $Tx_1 \ldots Tx_n$, where n is an integer greater than 1, 10, or 100 in various embodiments) to generate the data- or signal-bearing optical wavelength channels 215. The transmitter modules $Tx_1 \ldots Tx_n$ can be configured to be tunable to transmit one of the channels in the communication wavelength band 220 multiplexed (e.g., via multiplexer 182) onto a single optical fiber or multiple parallel fibers of the optical fiber link 117 (e.g., channels $115_1 \ldots 115_n$ emerging as signal-bearing channels 215). Embodiments of the optical receiver 110 at the terminal receive side of the optical fiber link 117 can include a WDM demultiplexer (e.g., demultiplexer 184) and optical WDM receiver modules ($Rx_1 \ldots Rx_n$, where n is an integer greater than 1, 10, or 100 in various embodiments) configured to be tunable to receive one or more of the channels in the wavelength band 220.

Embodiments of the wavelength band 220 can include any common optical telecommunication wavelength bands, such as the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675) wavelength bands.

Embodiments of the optical source 120 of the optical source 120 of spontaneous emission light (e.g., ASE) can be implemented in several ways to spectrally shape the spontaneous emission light 122 via optical filter 125 (OF), such a presented in the context of FIG. 2A to facilitate spectral power distribution. One or more optical amplifiers $150_1 \ldots 150_p$ along optical fiber link 117 can be configured to have a fixed overall optical output power, which is to be distributed among all WDM channels in a fully loaded system. However, if only a few WDM channels are initially installed, distributing the entire amplifier output power among those few WDM channels could, of itself, cause or result in, too high WDM signal powers per channel after such amplification. The optical source 120 can be used to reduce power from the WDM signals such as to balance the overall spectral power distribution along the optical fiber link 117 line until such time when all WDM channels are fully deployed, in which case the optical source 120 may be turned off.

FIG. 1 also illustrates apparatus 130 embodiments of the disclosure.

With continuing reference to FIGS. 1-3B, embodiments of the apparatus 130 can include an optical test module 132 for transmitting filtered spontaneous emission light 122 to a multi-wavelength-channel optical receiver 105 via a line-loading optical fiber link 134, the filtered spontaneous emission light 127 having a filtering spectrum 210 with dummy optical wavelength channels 217 separated by notches 218 in an optical wavelength band 220 for communications via the optical transmitter 105.

Embodiments of the test module 132 can be used at a planning phase, prior to deployment of any transmitter 105. Alternatively or additionally, embodiments of the test module 132 can be used to dynamically change the characteristics of a deployed transmitter during operation.

Embodiments of the optical test module 132 can be configured to set a transmission power parameter and/or spectral width 222 of one or more optical wavelength channels 217 of the optical transmitter 105 based on a measurement indicative of an optical noise level in at least one of the notches 318 (e.g., a total optical power level in the notch or notches 318) or an optical signal to noise ratio of one or more of the dummy optical wavelength channels 317 relative to the optical noise level in the notches 318 near, or frequency-adjacent, to the dummy optical wavelength channels 317 (e.g., notches 318a and 318b frequency-adjacent to dummy channel 317a) at the optical receiver 110 due to the transmission of filtered spontaneous emission light 122 through the system 100.

In some embodiments, the optical test module 132 is also capable of setting modulation parameters and/or an optical signal power of the optical transmitter 105 such that different data- or signal-bearing optical wavelength channels 315 have substantially different signal to noise ratios as measured at the optical receiver 110. In some such embodiments, the transmitter 105 is configured to set the modulation parameters and/or power such that the signal to noise ratios (e.g., SNR as determined as a ratio of the signal 315 relative to notches 318) of the signal-bearing optical wavelength channels 315 can vary by more than 1 dB over the channels 315.

In some embodiments, the optical test module 132 can include the optical source 120 of spontaneous emission light 122 and the tunable optical filter 125 connected to filter the light 122 and to deliver the filtered light 127 to the optical fiber link 117. In some such embodiments, the optical test module 132 can include an interleaver module 140 or a cascade of interleaver modules 140 configured to receive the spontaneous emission light 122 and provide a pattern of the wavelength bands 220 of the light 122 to the filter 125. For example, in some such embodiments, the pattern of the wavelength bands 220 can be or include an approximately periodic series of spectrally separated, about square-spectrum light bands such as shown in FIG. 2A. In some embodiments, a cascade of interleaver modules 140 facilitates providing the desired periodicity and generating sufficient extinction of power in the spectral notches 218 (e.g., an at least 95% power reduction as compared to the power of the dummy optical channel 217). In some embodiments, the periodic series of about square-spectrum channels can be configured to have an about 20, 20, 30, 40, 50, 60, 70, or 80 percent spectral-duty cycle and a periodicity of about 25, 50, 75, or 100 (e.g., in some embodiments as a fraction of the temporal cycle, or, in some embodiments as a fraction of the spectrum).

In some embodiments, the optical test module 132 includes an optical spectrum analyzer 145 (e.g., transmitter-side optical spectrum analyzer $OSA_1$) configured to measure the filtered spontaneous emission light 127 launched into the wavelength band 220 for communications via the optical transmitter 105 in the optical fiber link 117 connecting the optical transmitter 105 to the optical receiver 110. In some such embodiments, the optical spectrum analyzer 145 can be configured to measure the filtered spontaneous emission light 127 launched into the wavelength band 220 at a location between the optical transmitter 105 and a first amplifier $150_1$ of the optical fiber link 117. However, in other embodiments, the optical spectrum analyzer 145 or other optical spectrum analyzers can additionally or alternatively measure the filtered spontaneous emission light 127 at other locations along the optical fiber link 117 (e.g., at the optical receiver 110).

In some embodiments, the apparatus 130 includes a control module 160. The module 160 can have a electronic processing unit 162 (EPU) configured to read computer-readable instructions stored in non-transient computer readable memory 164 of the module 160 (e.g., hard disk, solid state, or other forms of non-volatile memory familiar to those skilled in the pertinent arts). The instructions can include an algorithm 166, e.g., instruction encoded as electronic binary data and stored in the memory 164, that when executed by the unit 162 (e.g., via one or more central processing units of the unit 162), cause the optical test module 132 to generate control signals 170, 172, 174, 176 (e.g., analog or instruct-bearing digitally encoded electronic signals familiar to those skilled in the pertinent arts). The control signals 170, 172, 174, 176 (e.g., sent via an electronic transmitter of the unit 162) can cause a change in the optical output from one or more of the optical transmitter 105, the optical source 120 or the tunable optical filter 125 or the adjustable gain equalization filter 180 optically coupled into the optical fiber link 117.

In some embodiments, the control module 160 is configured to receive signals 182, 184, 186 (e.g., via an electronic receiver of the unit familiar to those skilled in the art) indicative of the measurement of the optical noise level or the optical signal to noise ratio, and based on feedback from the measurement, cause the unit 162 to change one or more of the control signals 170, 172, 174, 176 to alter the optical output from one or more of the optical transmitter 105, the optical source 120, the tunable optical filter 125 or the adjustable gain equalization filter 180.

For example, in some embodiments at least one of the signals 182 received by the control module 160 is from an optical spectrum analyzer 145, the optical spectrum analyzer 145 configured to measure the filtered spontaneous emission light 127 launched into the wavelength band 220 at a location between the optical transmitter 105 and a first amplifier $150_1$ of the optical fiber link 117. In some embodiments, at least one of the signals 184 received by the control module 160 is from an optical spectrum analyzer 147 of the optical receiver 110, the optical spectrum analyzer 147 configured to measure the filtered spontaneous emission light 127 launched into the wavelength band 220 passing from a final amplifier $150_p$ of the second optical fiber link 117 to the optical receiver 110. In some embodiments, at least one of the signals 186 received by the control module 160 is from at least one of the receiver modules $Rx_1 \ldots Rx_o$ of the receiver 110, the signal 186 being indicative of the SNR of at least one of the signal-bearing channels 315.

In some embodiments, the change in optical output caused by the control signals 170, 172, 174, 176 includes changing one or more modulation parameters, changing an optical signal power, or changing the filtering of at least one signal-bearing optical wavelength channel 215, 315.

Embodiments of the system 100 can include the apparatus 130 or any of the apparatus' individual component parts (e.g., any of the optical source 120, the tunable optical filter 125, the interleaver module 140, the optical spectrum analyzer 145, or the control module 160).

The system 100 and apparatus 130 can be implemented in a variety of ways to determine and apply a capacity-improved or capacity-optimal spectral launch power distribution. For instance, the measurements 182, 184, 186 from the OSAs 145, 147 and receiver modules $Rx_1 \ldots Rx_n$ can be used as the basis to adjust the spectral power distribution of the filtered light 127 through the tunable optical filter 125 (e.g., dummy optical wavelength channels 217, FIG. 2A) and/or data- or signal-bearing optical wavelength channels 215 (FIG. 2B) to facilitate obtaining optimal WDM system aggregate transmission capacity. In addition to providing the optimum WDM channel power allocation, the system 100 and apparatus 130 can be implemented to determine and improve or approximately maximize the transmission capacity as well as more closely approach the Shannon limit of individual channels 217, 317 in the system 100.

The tunable optical filter 125 can be set to transmit line-loading spontaneous emission light 122 within certain frequency bands of channels to suppresses or substantially block out the launching of spontaneous emission light 122 within other frequency bands. While a wide variety of patterns of channel transmission and suppression are possible, in some cases such a pattern is chosen such that that: (a) it is on a small enough wavelength band 220 scale so as to not induce amplifier power or noise variations across it, and; (b) the wavelength scale is coarse enough to allow the optical spectrum analyzers 145, 147 used as monitors at the transmission and receive ends of the optical fiber link 117 to properly resolve the chosen pattern.

For instance, FIG. 2A illustrates an approximate periodic square-wave spectral pattern for the power distribution of a filtering spectrum 210 with dummy optical wavelength channels $217a \ldots 217d$ separated by notches $218a \ldots 218e$ with no data- or signal-bearing channels deployed therein. FIG. 2B illustrates the same filtering spectrum 210 except that one dummy optical wavelength channel $217c$ is suppressed at or near the wavelength locations of three data- or signal-bearing channels $215a$, $215b$, $215c$. E.g., the power ratio can equal the power of the received optical power in one or more of the dummy optical wavelength channels 217 to the average received optical power of in the notch(es) 218 of the filtered spectrum 210 at the receiver 110 as measured by $OSA_2$ 147.

As further explained below, the information provided by the measurements 182, 184, 186 and continuing feedback of such measurements can be used by algorithms 166 of various degrees of sophistication to facilitate estimation of the system's transmission capacity.

Measurements and estimates of transmission capacity.

Figure 4:
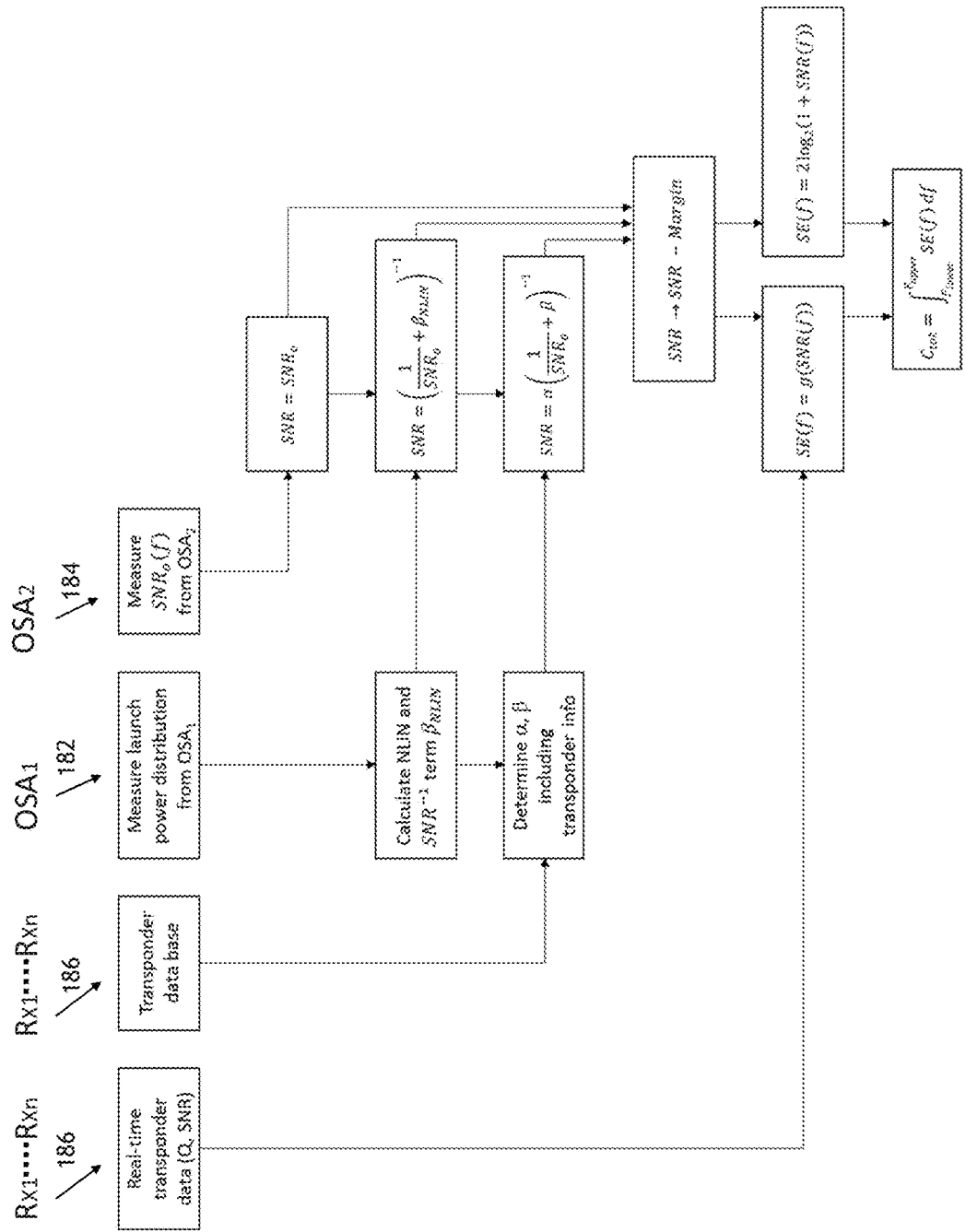
FIG. 4 presents a flowchart schematically illustrating example capacity prediction algorithms.

A summary flowchart of various capacity prediction algorithms of the disclosure is presented in FIG. 4.

In general, the capacity of a communication system is given by:

$$C_{tot} = \int_{F_{lower}}^{F_{upper}} SE(f) df, \quad (1)$$

where $F_{lower}$ and $F_{upper}$ are the lower and the upper end of the frequency range spanned by the system, and SE(f) is the achievable spectral efficiency as a function of frequency. Assuming an additive Gaussian noise channel, which is adequate for coherent optical systems without dispersion management, and in particular for those operating in the linear regime, Shannon's formula can be invoked to write Eq. (1) as:

$$C_{tot} = \int_{F_{lower}}^{F_{upper}} 2\log_2(1+SNR(f))df, \quad (2)$$

where the SNR is the signal-to-noise ratio as recovered by the receiver. While we use integral notation here, a discrete notation with finite frequency differences $\Delta f$, instead of frequency differentials $df$, can be used as part of the algorithm 166. While not limiting the scope of the disclosure by theoretical considerations, equation (2) may approximate an upper bound on $C_{tot}$ of Eq. (1).

In one embodiment, the SNR can be determined only by the spontaneous emission light 122 from in-line amplifiers 150$_1$ . . . 150$_p$ (e.g., as determined by measuring the optical signal to noise ratio, $SNR_o$). For example the $SNR_o$ can be measured by taking the power ratio of the dummy optical wavelength channels 217 to the average of the notches 218 of the filtered spectrum 210 at the receiver 110 (e.g., the received optical power in one or more of the dummy optical wavelength channels 217) as measured by OSA$_2$ 147. Appropriate interpolation, familiar to those skilled in the art, then yields $SNR_o(f)$ at the desired frequency resolution.

A first-order estimate of the systems 100 transmission capacity (e.g., the upper bound) is then obtained as:

$$C_{tot} = \int_{F_{lower}}^{F_{upper}} 2\log_2(1+SNR_o(f))df. \quad (3)$$

This capacity expression can then be used as a cost function to be maximized by iteratively adjusting the controllable system elements, as discussed below.

More accurately, the SNR to be inserted in Eq. (2) can be approximated as $$SNR = \alpha\left(\frac{1}{SNR_o} + \beta\right)^{-1}, \quad (4)$$

where $\alpha$ and $\beta$ represent characteristics of the system and the amplifier. For example, $\alpha$ can describes penalties that shift the Bit-error-rate (BER) versus the SNR curve by $10\log_{10}\alpha$ in terms of SNR on a dB scale; $\beta$ can represent the sum of additional noise terms ($\beta=\Sigma_i 1/SNR_i$) such as amplifier noise, nonlinear interference noise (NLIN), etc. Amplifier noise can be measured in a back-to-back configuration and stored in an amplifier data base, and NLIN can be calculated for a given system launch power distribution using analytic and semi-analytic models as part of the controller shown in FIG. 4. The resulting SNR according to Eq. (4), when inserted into Eq. (2), then yields a more accurate representation of the system's Shannon capacity that may be iteratively maximized as a cost function through the control algorithm described below.

Figure 5:
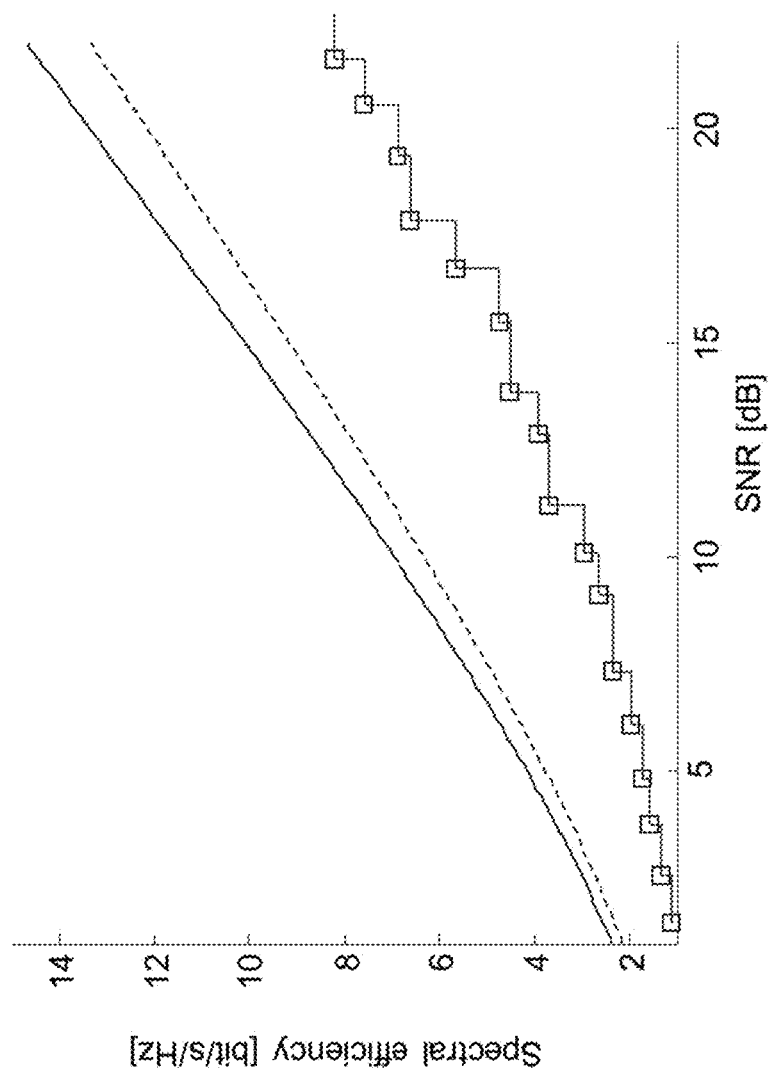
FIG. 5 present example plots of spectral efficiency versus SNR for exemplary flexible amplifiers (square) and the Shannon limit (black) without (solid) and with (dashed) guard intervals.

If a more representative estimate for the capacity is desired (e.g., to be used to provide a more accurate cost function for adjusting system parameters), then the characteristics of various operational modes of the amplifiers to be eventually installed in the system can be used in terms of their spectral efficiency SE vs. SNR behavior, such as shown for an exemplary amplifier (squares) in FIG. 5. The solid line is the Shannon limit and the dashed line is the Shannon limit accounting for channel guard intervals. Based on the measured OSNR vs frequency, an SNR vs frequency is calculated and FIG. 5 is used to translate the SNR into an SE vs frequency, SE=g(SNR) using a amplifier data base, which is then put into Eq. (1) to calculate system capacity. If desired, restrictions can be placed, e.g., only modes using a single symbol rate may be considered across the system bandwidth.

For embodiments of the system 100 including amplifiers then input from the amplifiers can also be used to refine the transmission capacity estimate.

In addition, a system margin (e.g., guard intervals) may be included in the various capacity estimates by reducing the actually available SNR by a safety margin so as to constrain the system 100 to a lower spontaneous emission mode of operation, to facilitate proper functionality even when the SNR of the signal-bearing channels 315 is degraded by the allocated safety margin.

Iterative Capacity Prediction Algorithms

Any of the above-disclosed capacity estimates can be used as a cost functions to implement in the algorithm 166 as an iterative control loop considering the received measures 182, 184, 186 and then sending control signals 170, 172, 174, such as discussed in the context of FIG. 1. Such an algorithm can also have access to the measurements indicative of the state of the optical fiber link 117 in terms of measured spectral output power and noise distribution as a function of the spectral launch power distribution and the GE 180 settings via an appropriate data base, and using this information to control amplifier output power, optical source 120 and tunable optical filter 125 settings, as well as GE 180 settings so as to maximize the above described cost function. In some embodiments, in the absence information about the state of the optical fiber link 117, the control module 160 can be programs to implement process including an iterative dither, a random walk, a genetic algorithm, or any other machine learning approach to blindly improve the cost function and thereby maximize capacity. As part of this process the control module 160 may implement a waterfilling algorithm to allocate signal power according to the spectral dependence of the system noise, as familiar to those skilled in the pertinent art, and consequently send command signals 170 to eliminate certain wavelength channels.

Although the present disclosure has been described in detail, those skilled in the art should understand that they can make various changes, substitutions and alterations herein without departing from the scope of the invention.

What is claimed is:

1. A system, comprising:
   an optical receiver for multi-wavelength-channel optical communication;
   an optical source of spontaneous emission light and a tunable optical filter connected to receive the light at an input, the tunable optical filter having a filter spectrum with spectral passbands separated by spectral notches; and
   an optical fiber link connecting an output of the optical filter to the optical receiver for multi-wavelength-channel optical communication, wherein
   the optical receiver is configured to make a measurement indicative of an optical power level in at least one of the notches or to make measurements of optical power levels in at least one of said passbands and at least one of said notches in response to the optical source transmitting the filtered light to the optical fiber link.

2. The system of claim 1, further including an optical transmitter configured to set one or more modulation parameters and/or an optical signal power of at least one signal-bearing optical wavelength channel based on the made measurement or made measurements.

3. The system of claim 1, wherein the tunable optical filter is configured to adapt the filtering of the filtered light based on the made measurement or made measurements.

4. The system of claim 1, wherein the system is part of a terrestrial or a submarine optical point-to-point or mesh network system.

5. A system, comprising:
an optical receiver for multi-wavelength-channel optical communication;
an optical source of spontaneous emission light and a tunable optical filter connected to receive the light at an input, the tunable optical filter having a filter spectrum with spectral passbands separated by spectral notches;
an optical fiber link connecting an output of the optical filter to the optical receiver for multi-wavelength-channel optical communication, wherein the optical receiver is configured to make a measurement indicative of an optical power level in at least one of the notches or to make measurements of optical power levels in at least one of said passbands and at least one of said notches in response to the optical source transmitting the filtered light to the optical fiber link; and
an optical transmitter configured to set one or more modulation parameters and/or an optical signal power of at least one signal-bearing optical wavelength channel based on the made measurement or made measurements, wherein the optical transmitter is configured to set a symbol rate of at least one signal-bearing optical wavelength channel based on the measurement or measurements.

6. The system of claim 5, wherein the optical transmitter is capable of setting one or more power shaping parameters and/or symbol rate of at least one signal-bearing optical wavelength channel such that different signal-bearing optical wavelength channels have substantially different signal to noise ratios than each other as measured at the optical receiver.

7. The system of claim 6, wherein the optical transmitter is configured to perform the setting such that the signal to noise ratios of the signal-bearing optical wavelength channels vary by more than about 1 dB over the channels.

8. An apparatus, comprising:
an optical test module including a source of spontaneous emission light and an optical filter connected to receive said spontaneous emission light from the source, the module capable of transmitting filtered spontaneous emission light from the optical filter to a first end of an optical fiber link, the filter having a filtering spectrum with optical passbands separated by optical notches, and wherein
the optical test module is configured to determine an optical transmission characteristic of said optical fiber link based on a measurement, at a second end of the optical fiber link, indicative of an optical power received in one or more of the notches or indicative of an optical power received in one or more of said passbands over an optical power received in one or more of the notches received at the second end of the optical fiber link.

9. The apparatus of claim 8, wherein the optical test module is capable of determining modulation parameters and/or an optical signal power of an optical transmitter such that the optical transmitter transmits different signal-bearing optical wavelength channels to the second end of said optical fiber link with substantially different signal to noise ratios thereat.

10. The apparatus of claim 9, wherein the signal to noise ratios of the signal-bearing optical wavelength channels vary by more than 1 dB over the channel.

11. The apparatus of claim 9, wherein the optical transmitter is configured to set a symbol rate of at least one signal-bearing optical wavelength channel based on the measurement or measurements.

12. The apparatus of claim 8, further including a control module having an electronic digital processing unit configured to read and execute instructions stored in non-transient computer readable memory of the module, the instructions for performing steps of a method to cause the optical test module to generate control signals to change the optical output from one or more of an optical transmitter, the optical source or the tunable optical filter or an adjustable gain equalization filter in the optical fiber link.

13. The apparatus of claim 12, wherein the control module is configured to receive signals indicative of the made measurement or measurements, and based the made measurement, cause the unit to change one or more of the control signals to alter the optical output from one or more of the optical transmitter, the optical source, the tunable optical filter or the adjustable gain equalization filter.

14. The apparatus of claim 12, wherein the change in optical output caused by the control signals includes changing at least one of a optical modulation parameter, an optical transmission power, and a filtering characteristic of at least one data-bearing optical wavelength channel.

15. An apparatus, comprising:
an optical test module including a source of spontaneous emission light and an optical filter connected to receive said spontaneous emission light from the source, the module capable of transmitting filtered spontaneous emission light from the optical filter to a first end of an optical fiber link, the filter having a filtering spectrum with optical passbands separated by optical notches, and wherein
the optical test module is configured to determine an optical transmission characteristic of said optical fiber link based on a measurement, at a second end of the optical fiber link, indicative of an optical power received in one or more of the notches or indicative of an optical power received in one or more of said passbands over an optical power received in one or more of the notches received at the second end of the optical fiber link, and
the optical test module includes an optical interleaver or a cascade of optical interleavers configured to receive the spontaneous emission light and provide a pattern of wavelength bands to the filter.

16. The apparatus of claim 15, wherein the pattern of the wavelength bands includes an approximately periodic series of bands of about 50 percent spectral-duty cycle or less.

17. The apparatus of claim 16, wherein the optical test module includes an optical spectrum analyzer configured to measure the filtered spontaneous emission light transmitted to the optical fiber link.

* * * * *

UNITED STATES PATENT AND TRADEMARK OFFICE
CERTIFICATE OF CORRECTION

PATENT NO. : 11,362,755 B2  
APPLICATION NO. : 16/118882  
DATED : June 14, 2022  
INVENTOR(S) : Peter Winzer, Junho Cho and Andrew Chraplyvy It is certified that error appears in the above-identified patent and that said Letters Patent is hereby corrected as shown below:

In the Specification

In Column 11, approximately Line 45, Equation 2, delete "$C_{tot} \int_{F_{lower}}^{F_{upper}} 2 \log_2(1+SNR(f)df, \quad (2)$" and insert -- $C_{tot} = \int_{F_{lower}}^{F_{upper}} 2 \log_2(1 + SNR(f))\, df, \quad (2)$ --

Signed and Sealed this  
Sixteenth Day of August, 2022

Katherine Kelly Vidal  
*Director of the United States Patent and Trademark Office*